United States Patent

[11] 3,580,239

[72] Inventors Hideo Watanabe;
John E. Leonard, Fullerton, Calif.
[21] Appl. No. 871,077
[22] Filed Oct. 3, 1969
[45] Patented May 25, 1971
[73] Assignee Beckman Instruments, Inc.

[54] METHOD AND APPARATUS FOR IN VIVO POTENTIOMETERIC MEASUREMENTS
4 Claims, 4 Drawing Figs.

[52] U.S. Cl. .................................................. 128/2.1R,
128/417, 204/195
[51] Int. Cl. .................................................. A61b 5/04
[50] Field of Search ........................................ 128/2, 2.1,
2.16, 2.06, (Digest), 404, 417, 418; 204/195

[56] References Cited
UNITED STATES PATENTS

| | | | | |
|---|---|---|---|---|
| 3,088,905 | 5/1963 | Glover | | 204/195 |
| 3,325,378 | 6/1967 | Greene et al. | | 204/195X |
| 3,438,886 | 4/1969 | Ross | | 204/195 |
| 3,445,369 | 5/1969 | Porter et al. | | 204/195 |
| 3,454,485 | 7/1969 | Hauk et al. | | 204/195 |
| 3,467,590 | 9/1969 | Gibson et al. | | 204/195 |
| 3,505,196 | 4/1970 | Dahms | | 204/195 |

*Primary Examiner*—Richard A. Gaudet
*Assistant Examiner*—Kyle L. Howell
*Attorneys*—Thomas L. Peterson and Robert J. Steinmeyer ABSTRACT: A biomedical electrode assembly for detecting electrical signals from a living subject. The electrolyte reservoir of the assembly is divided into two separate sections by a dialysis membrane. The section which is in contact with the skin of the living subject contains an electrolyte which will not irritate the skin while the other section of the electrolyte reservoir contains an electrode component and an electrolyte which cooperates with the component to produce a constant, known reference voltage. The first mentioned electrolyte is preferably isotonic saline solution and the second electrolyte is at least 3 molar potassium chloride solution.

INVENTORS
JOHN E. LEONARD
HIDEO WATANABE

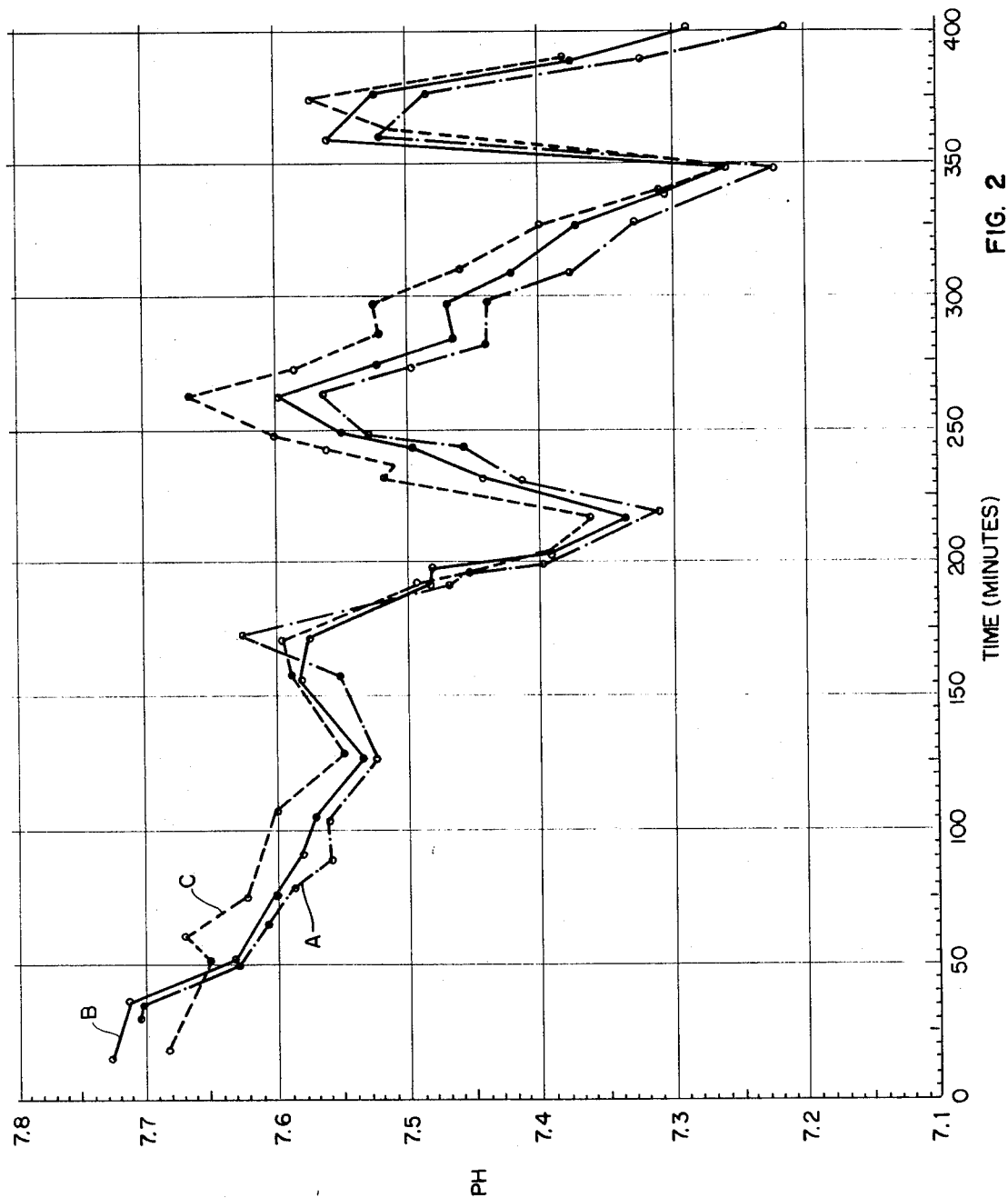

Patented May 25, 1971

INVENTORS
JOHN E. LEONARD
HIDEO WATANABE

BY          ATTORNEY

METHOD AND APPARATUS FOR IN VIVO POTENTIOMETERIC MEASUREMENTS

CROSS-REFERENCE TO RELATED APPLICATION

This is a divisional application of copending application Ser. No. 676,970, filed Oct. 20, 1967, entitled "Method for In Vivo Potentiometric Measurements," now U.S. Pat. No. 3,498,289.

DISCLOSURE

This invention relates generally to medical instrumentation and, more particularly, to a biomedical electrode assembly useful for making *in vivo* potentiometric measurements of the body fluid of a living subject.

For a number of years potentiometric measurements of hydrogen or other ions have been made in the human body or in living animals for the purpose of determining the physical condition of the subject. Such measurements have been referred to as being *in vivo*. However, the term *in vivo* can be construed to apply to two different kinds of measurements, one of which is typified by the rather old practice of measuring pH intragastrically, that is, measuring the hydrogen ion concentration of the fluid in the stomach of a living subject with a pH glass electrode. The glass electrode is passed through the esophagus to the stomach with a reference contact normally being made to the subject by simply placing a conventional electrochemical reference electrode in the mouth of the subject so as to be in contact with the mucous tissue. In this type of reference contact there is a continuous flow path between the reference electrode and the glass electrode through the saliva in the mouth and the fluids in the esophagus and stomach. Thus, the reference electrode in actuality contacts the same fluid as does the glass electrode. Consequently, this type of *in vivo* measurement is very little different from the conventional measurement which is made on a bench wherein the body fluid which is being analyzed is withdrawn from the subject and both the glass and reference electrodes are immersed directly into the fluid.

In more recent years, however, the term *in vivo* has been applied to measurements made in body fluids that normally circulate entirely within the body within its own protective skin, such as the blood, the lymph, or the interstitial fluid. It is this latter form of *in vivo* potentiometric measurement with which the present invention is concerned. The problem of making a suitable reference contact in this form of *in vivo* measurement has been considered to be very complicated by those skilled in the art since within the body many different kinds of biopotentials exist, such as cell membrane potentials, nerve membrane potentials, muscle potentials and the conventional electrocardiograph potentials. These potentials are very large, on the order of 10 to 100 millivolts. It has been uniformly considered by the experts in the medical field that these biopotentials would interfere with, if not completely obscure the potentials between the glass electrode within the body and a reference contact if the reference contact were made remote from the glass electrode. Consequently, in order to avoid these biopotentials *in vivo* potentiometric measurements on fluids which circulate within the body of a living subject have been performed by making the reference electrode contact directly with the body fluid, for example, with the reference electrode contacting flowing blood in an artery or vein or in an extracorporeal blood loop from an artery to a vein. Also, the reference electrode contact has been made immediately adjacent to or as close as possible to the glass electrode in the blood itself to avoid the biopotential interferences mentioned above. This is difficult to accomplish due to the difficult manipulations required of the reference electrode and the electrical impedance problems. In addition, with the reference electrode liquid junction being in direct contact with the flowing blood, the strong salt solution employed in the electrode, such as saturated potassium chloride, comes in contact with the blood oftentimes changing its character in several different ways. For instance, the salt solution from the reference electrode can coagulate protein or hemolyze red cells in the blood. Therefore, this conventional form of reference contact for making *in vivo* analyses of body fluid has substantial disadvantages.

It has been discovered that the reference contact required for *in vivo* potentiometric measurements of body fluids which circulate within the organs of a living subject may be made by simply making reference contact with the surface of the living subject exposed to the external environment as, for example, by contacting a reference electrode to the skin of the subject. *In vivo* measurements made in this manner on a continuous basis have been found to be entirely equivalent to those made in accordance with the conventional techniques mentioned previously and to those made on samples of blood withdrawn from living subjects and measured in the conventional way by immersing glass and reference electrodes directly into the sample in a bench test. The fact that such measurements are equivalent is completely unexpected in light of the previously discussed theories accepted by the experts in the medical field regarding the effect of biopotentials on *in vivo* potentiometric measurements.

According to the present invention, there is provided an improved electrode assembly which may be utilized either as a reference electrode in the method mentioned above or as a biopotential skin electrode for ECG. studies. Such an improved electrode differs from the conventional biopotential skin electrode in that the electrolyte reservoir is divided into two separate sections by a dialysis membrane. The section which is in contact with the skin of the living subject contains an electrolyte which is compatible with the skin, that is, does not irritate the skin. The other section of the electrolyte reservoir contains an electrode component and an electrolyte which is compatible with the electrode component, that is to say, cooperates with the electrode component to produce a constant, known reference voltage. This requires that the electrolyte have a higher ionic concentration than that of the first mentioned electrolyte which would irritate the skin if in contact with it. By this arrangement, the electrolyte having the higher ionic concentration in contact with the electrode component is separated from the skin via the membrane and first mentioned electrolyte which is compatible with the skin. Thus a constant, known output voltage is achieved without irritating the skin of the subject to which the electrode assembly is applied.

Other objects, aspects and advantages will become apparent from the following description taken in connection with the accompanying drawings wherein:

FIG. 2 is a graph showing the results of *in vivo* measurements made in accordance with the present invention and of measurements made in the conventional manner;

As already stated, it h80 been discovered that *in vivo* potentiometric measurements of body fluids may be successfully made by contacting the body fluid circulating within the organ of a living subject with a sensing electrode and by completing the electrical circuit for the ion concentration measurement by making reference contact with the surface of the living subject which is exposed to the external environment. The surfaces exposed to the external environment include not only the skin but also the mucous tissue of the mouth or nose, or other external body cavities, such as the anus or vagina. Obviously reference contact with the skin is the most convenient method. Such contact overcomes the disadvantage of the previously used method for making reference contacts for *in*

*vivo* potentiometric measurements in that no salt bridge solution contacts the body fluid directly, thus avoiding coagulation of the blood protein or hemolization of red blood cells in the case that blood is the body fluid.

While we do not wish to be bound to any theory, it is believed that the reference contact made in accordance with the present invention is possible, in spite of the existence of large cell membranes and nerve membrane potentials, etc. between the electrodes, due to the fact that the reference contact being made remote from the sensing electrode results in such biopotentials canceling each other out in algebraic fashion. That is, the biopotentials are polarized plus or minus across the large mass of membranes or fibers between the electrodes so that the resultant offset potential due to the various nerve and cell potentials is essentially zero.

Tests have been conducted to establish that pH measurements made in accordance with the present invention produce results which are entirely equivalent to measurements made in a conventional manner either by contacting sensing and reference electrodes directly to blood flowing in an extracorporeal loop connected to a living subject or by withdrawing blood from the loop and making a bench test of the sample by immersing a glass and reference electrode directly into the sample.

Figure 1:
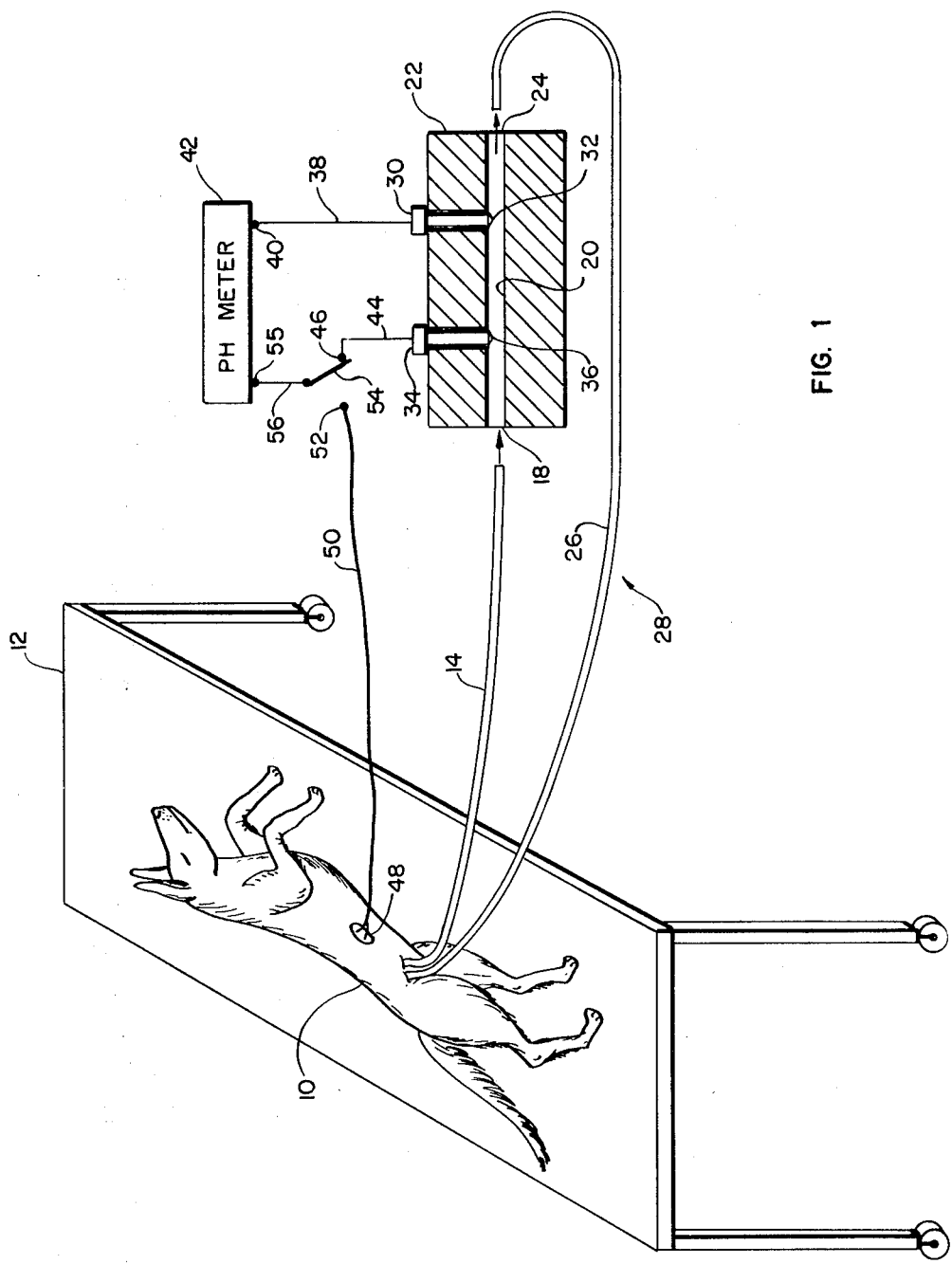
FIG. 1 is a schematic showing of an apparatus for measuring the ionic concentration of blood flowing in an extracorporeal loop connected to a dog, with the reference contact being made to the dog in accordance with the present invention and the flow cell of the apparatus being shown in enlarged scale and in cross section.

Reference is now made to FIG. 1 which illustrates schematically the arrangement for making the aforementioned tests. In such arrangement, a dog 10 is laid on top of a suitable supporting table 12. A tube 14 is connected to the femoral artery of the dog at one end while its other end is in flow communication with the inlet port 18 of a cannula or flow passage 20 of a pH flow cell assembly 22. The outlet end 24 of the passage 20 is connected via a tube 26 to the femoral vein in the dog's leg. The tubes 14 and 26 together with the passage 20 in the flow cell 22 provide an extracorporeal loop, generally referred to by numeral 28, through which the dog's blood may circulate. Mounted in the flow cell 22 is a pH glass electrode 30 with its ion sensitive bulb 32 disposed in the passage 20. A reference electrode 34 is also mounted in the flow cell 22 with its liquid junction end 36 mounted in the passage 20 in a conventional fashion. The glass electrode 30 is connected via a conductor 38 to one terminal 40 of a pH meter 42. A second reference electrode 48 is shown in contact with the abdomen of the dog 10 and is connected through a lead 50 to a terminal 52. A switch 54 movable between the contacts 46 and 52 is connected to the second terminal 55 of the pH meter via a conductor 56. Consequently, it is seen that by the arrangement shown in FIG. 1 there is provided a switching device which permits the glass electrode 30 to be referred either to the reference electrode 34 in the flow cell 22 or to the electrode 48 contacting the skin of the dog.

In actual tests conducted on a dog, the glass electrode 30 was a conventional pH glass electrode and the reference electrode 34 a conventional standard calomel reference electrode, the construction of which are well known in the art and constitute no part of the present invention. The blood of the animal flowed through the extracorporeal loop at a rate of about 200 milliliters per minute. The electrode 48 was an electrode of the type employed in ECG. studies and is referred to in the art as a biopotential skin electrode when used for such purpose. The construction of the electrode was the same as the biopotential skin electrode disclosed in U.S. Pat. No. 3,295,515 to Kahn, assigned to the assignee of the present application. A relatively strong ECG. electrolyte gel sold as Electrode Paste by Beckman Instruments, Inc. was employed in the electrode to provide electrolytic contact between the silver-silver chloride component employed in the electrode and the skin of the dog. It is understood, however, that other types of biopotential skin electrodes could be employed, as for example, the electrodes disclosed in U.S. Pats. Nos. 3,151,619 or 3,170,459. Since, as a practical matter, the electrode 48 in contact with the dog in accordance with the present invention is not utilized for measuring skin potentials but rather serves as a reference contact, it will be referred to hereinafter as a bioreference electrode rather than a biopotential skin electrode.

In conjunction with the two *in vivo* potential measurements made during the test with the apparatus described hereinabove, there was also simultaneously made a conventional blood pH measurement on a bench with conventional pH measuring equipment by periodically withdrawing a small sample of blood from the extracorporeal loop 28 and making such a measurement. The three types of measurements were made at roughly 15 minute intervals over a run which extended over approximately 400 minutes. During this time period, the blood system was forced to go through a large number of pH changes by means of various procedures, as by giving the dog forced ventilation with a respirator or by injecting the dog with sodium bicarbonate and ammonium chloride solutions. The data resulting from such tests is plotted on the chart illustrated in FIG. 2 wherein the ordinate is expressed in terms of pH and the abscissa in terms of time in minutes. The curve A in FIG. 2 represents the pH measurements made with the bioreference electrode 48 and the glass electrode 30. The curve B represents the pH measurements made with the conventional calomel reference electrode 34 and the glass electrode 30. The curve C represents the pH measurements made by making bench tests on samples of blood withdrawn from the extracorporeal loop 28 using conventional pH measuring equipment. As seen from the curves, during the experiment the pH of the blood changed radically over about five different excursions which lasted 30 or 40 minutes apiece due to the various procedures invoked upon the dog discussed above.

It is seen that the measurements made by the three methods discussed above are closely comparable and are within the tolerance of that to be expected in comparing measurements of this type over the whole range of the experiment. It is noted that the pH excursions during the course of the experiments extended from 7.2 pH to 7.7 pH units while the measurements by the three different methods described herein were within $\pm$ 0.1 pH units in the worst case and normally between $\pm$ 0.02 to 0.03 pH units of each other. A comparability of this type is very good and is the most that could be expected in a continuous blood measurement when it is considered that there are substantial difficulties in maintaining sampling procedures rigid and repeatability for the bench measurements as well as in maintaining the temperature and temperature gradients repeatable and reproducible during the period of the experiment.

It is noted that the use of the bioreference electrode of the type described in the aforementioned Kahn patent was for matter of convenience only. Equivalent results have also been achieved by utilizing in place of the skin electrode 48 a standard calomel reference electrode. In the use of the latter electrode, the electrode was secured to the body of the dog by adhesive tape and the liquid junction of the electrode was contacted to the skin of the dog through a layer of conventional electrolyte gel of the type mentioned before in connection with the Kahn biopotential skin electrode.

It can be appreciated that, in accordance with the present invention, it is merely necessary that some form of reference contact be made with the surface of a living subject which is exposed to the external environment if the contact is made sufficiently remote from the sensing electrode to eliminate the effects of biopotentials as discussed previously. For example, any one of the aforementioned electrodes could be employed in making a reference contact in accordance with the present invention by placing the reference electrode in the mouth of the living subject or other cavities of the subject rather than on the skin, but such methods have obvious disadvantages.

One can appreciate that the use of a conventional reference electrode for making the reference contact to a subject's skin in accordance with the present invention is somewhat awkward. The use of such an electrode requires that the subject be immobilized and also that there be sufficient room available to tape the electrode to the skin of the subject. Also, over a period of time the electrolyte gel providing the salt bridge connection between the liquid junction of the reference electrode and the skin either dries up or may accidentally be wiped away thus breaking the reference contact. It is for these reasons that it is most desirable to employ a bioreference skin electrode which is secured to the skin by a simple adhesive disc in practicing the present invention. While such an electrode is entirely satisfactory for making a reference contact for *in vivo* pH measurements as evidenced from the data illustrated in FIG. 2, the strong electrolyte gel used in the electrode presents two problems. One is that the gel is incompatible with the skin of most human subject, that is, over a period of several hours the skin will become irritated and actually dehydrated. In some cases the gel will kill a portion of the skin underneath the electrode. The other problem is that in pH measurements it is most desirable to have a constant, known reference potential that is comparable to that which one would obtain when utilizing a standard reference electrode. However, by use of a bioreference skin electrode employing the aforementioned conventional ECG. electrolyte gel, a potential in pH measurements is developed which is significantly different than that when employing a conventional reference electrode. For example, when using an electrode of the type described in the aforementioned Kahn patent, with a silver-silver chloride pressed pellet electrode component in contact with the conventional ECG. type electrolyte gel, the potential developed by the electrode can be as much as 20 millivolt different from that of a standard calomel reference electrode. This offset potential amounts to a zero shift in the pH meter and is inconvenient in calibrating the meter. While the aforementioned problem of skin irritation may be avoided by use of a lower ionic concentration gel, such as isotonic saline electrolyte gel, the offset potential discussed above is multiplied several fold, on the order of 70 to 80 millivolts, thus making the calibration procedures even more difficult.

Thus, in accordance with the present invention, there is provided an improved bioreference skin electrode which overcomes both of the disadvantages discussed hereinabove.

Figure 4:
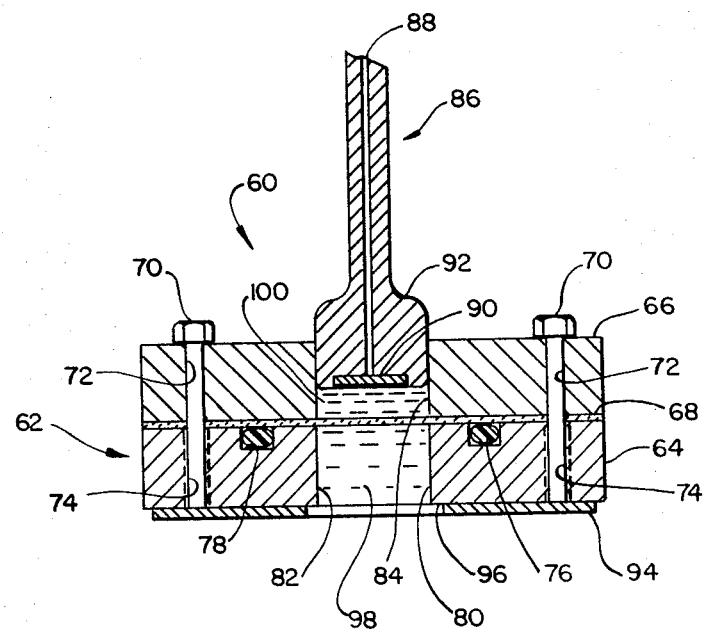
FIG. 4 is a cross-sectional view taken along 4—4 of FIG. 3.
Figure 3:
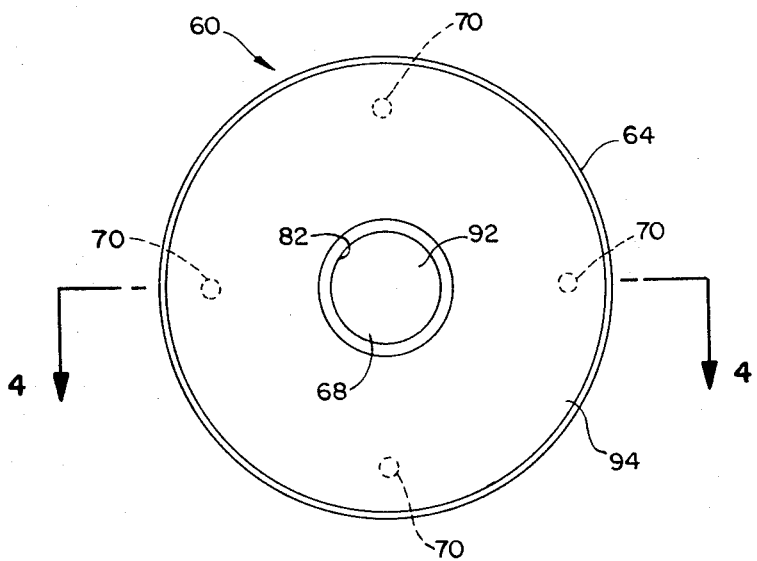
FIG. 3 is a bottom view, greatly enlarged, of an improved electrode assembly made in accordance with the present invention.

Reference is now made to FIGS. 3 and 4 wherein such improved electrode is referred to generally by numeral 60. The electrode assembly 60 comprises a generally flat circular disc 62 formed of two annular rings or layers 64 and 66. The two layers 64 and 66 are separated by a dialysis membrane 68 such as cellophane, collodion, cellulose acetate, protein membranes such as sheep gut or other animal tissues or microporous polyvinyl chloride. The membrane 68 is clamped between the two layers 64 and 66 by bolts 70 passing through unthreaded passages 72 in the upper layer 66 and threaded passages 74 in the layer 64. A rubber O-ring 76 is disposed in an annular groove 78 in the upper surface of the layer 64 to ensure that the two layers as well as the membrane 68 are adequately sealed together.

It can be appreciated that the membrane 68 serves to separate the central passage 80 extending through the disc 62 into a front reservoir 82 and a rear reservoir 84. A cable, generally referred to by numeral 86, carries a conductor 88 which is connected at its end to an electrode component 90 which is preferably a silver-silver chloride pellet formed by compressing a mixture of powdered silver and powdered silver chloride in a manner well known in the art. As seen in FIG. 4, the electrode component 90 is disposed at the end of the cable 86 so as to be capable of contacting electrolyte in the reservoir 84. The sheath 92 of the cable 86 is preferably formed of a resilient material such as rubber or plastic so that the cable 86 may be frictionally fixed into the reservoir 84, yet be readily withdrawn when it is necessary to fill or replace electrolyte in the rear reservoir 84. In order to secure the assembly 60 to the skin of a living subject, an annular paper disc 94 having adhesive on its front and rear faces is secured to the front face 96 of the disc 64 so that the assembly may be secured to the skin of the test subject.

By use of the double reservoir electrode assembly illustrated in FIGS. 3 and 4, an isotonic saline gel 98, which does not irritate the skin, may be placed in the front reservoir 82 while an electrolyte gel 100 compatible with the electrode component 90 may be provided in the rear reservoir 84. In the case of electrolyte 100, the term "compatible" means that the electrolyte has an ionic concentration substantially greater than that of the electrolyte 98 so that the potential developed by the electrode component 90 in contact with the electrolyte 100 will be predetermined and constant and, therefore, be equivalent to that developed by standard reference electrodes. This could not be achieved, as indicated above, if the electrolyte 100 were a conventional electrolyte gel of the type normally used with biopotential skin electrodes in ECG. studies. Preferably the electrolyte 100 is 3 Molar KCl or saturated KCl to which there is added a suitable gelling agent. Thus, by electrode assembly 60 there is provided a bioreference electrode which does not produce an offset potential and, therefore, is convenient to utilize due to the elimination of calibration problems, and avoids the problem of skin irritation discussed previously. Also, due to the use of a dialysis membrane 68 separating the front reservoir 82 from the rear reservoir 84, a low junction potential separates the two chambers so that there is no interference of liquid junction potentials which would produce errors in ion concentration measurements.

Another advantage of the electrode assembly 60 is that, because the strong potassium chloride solution 100 is placed in the back reservoir 84 with a weaker isotonic solution in the front reservoir 82, an osmotic pressure gradient is developed between the two reservoirs which causes a decrease in the total pressure in reservoir 82. This osmotic effect is due to the difference in ionic strengths on opposite sides of the permeable membrane 68 and the fact that the water activity is lower in the reservoir 84 than in the reservoir 82. Thus, water will tend to transport from the reservoir 82 to the reservoir 84. However, since the isotonic saline solution 98 in the front reservoir 82 has a concentration essentially the same as that of the body with which the electrode assembly is in contact, such as osmotic effect does not occur across the skin of the body. Consequently, the lowering of the osmotic pressure in the chamber 82 tends to hold the assembly onto the skin and thus assists the adhesive disc 94 in this function.

An electrode assembly of the same structure as the assembly 60 described herein has been employed as a bioreference contact in experiments of the type described previously in connection with FIGS. 1 and 2 and with the same results except for the fact that there was no inconvenience associated with the operation of this system due to offset potentials which must be calibrated out of the system as occurs when conventional biopotential skin electrodes using conventional electrolyte gels are employed as the reference contact.

While the present invention pertains to the making of reference c4ntacts in performing *in vivo* pH measurements, it is understood that the electrode assembly 60 would provide a superior electrode for use in biopotential measurements, such as ECG. measurements, since the electrode component 90 is completely isolated mechanically from the skin. Consequently, motion artifacts which are frequently troublesome in the conventional biopotential skin electrode would be avoided. Consequently, the electrode assembly 60 may be employed either as a bioreference electrode or a biopotential skin electrode.

Although several embodiments of the invention have been disclosed herein for purposes of illustration, it will be understood that various changes and variations can be made in such embodiments without departing from the spirit and scope of the invention as defined by the appended claims.

I claim:

1. A biomedical electrode assembly for detecting electrical signals from a living subject comprising a relatively flat disc of nonconducting material having an electrolyte reservoir therein opening in the front face of the disc, a single electrode component fixedly mounted in said reservoir behind said front face, a conductor connected to said electrode component and extending to the exterior of said disc for connection to an electrical circuit, and adhesive means on said front face of said disc for attaching the assembly to the skin of said subject wherein the improvement comprises:
- a dialysis membrane extending across said reservoir behind said front face of said disc and spaced from said electrode component to provide a front reservoir section adjacent to said face and a rear reservoir section;
- said electrode component being positioned in said rear reservoir section; and
- said front reservoir section holding a first electrolyte compatible with the skin of a living subject and said rear reservoir section holding a second electrolyte having an ionic concentration greater than that of said first electrolyte.

2. An electrode assembly as set forth in claim 1 wherein said disc is formed of two layers, said front reservoir section being in one of said layers and said rear reservoir section being in the other of said layers;
- said dialysis membrane being positioned between said two layers; and
- means detachably securing said layers together.

3. A method of making contact of an electrode assembly with the skin of a living subject comprising:
- providing an electrode assembly comprising a nonconductive disc with front and rear reservoir sections separated by a dialysis membrane, with the front reservoir section opening in the front face of said disc
- filling said front reservoir section with a first electrolyte compatible with the skin;
- filling said rear reservoir section with a second electrolyte having an ionic concentration greater than that of said first electrolyte;
- contacting the second electrolyte in the rear reservoir section with an electrode component; and
- applying the front face of said disc to the skin of the living subject.

4. A method as set forth in claim 3 wherein said first electrolyte is isotonic saline solution and said second electrolyte is at least 3 Molar potassium chloride solution.